(12) United States Patent
Hellström et al.

(10) Patent No.: US 8,924,017 B2
(45) Date of Patent: Dec. 30, 2014

(54) METHOD AND APPARATUS FOR RECYCLABLE ABSORPTION OF ELECTRIC RETARDATION ENERGY FROM AN INDUSTRIAL ROBOTICS SYSTEM

(75) Inventors: Jerker Hellström, Mölndal (SE); Magnus Wide, Mölndal (SE)

(73) Assignee: Aros Electronics AB, Molndal (SE)

( * ) Notice: Subject to any disclaimer, the term of this patent is extended or adjusted under 35 U.S.C. 154(b) by 1751 days.

(21) Appl. No.: 11/920,542

(22) PCT Filed: May 19, 2006

(86) PCT No.: PCT/SE2006/000578
§ 371 (c)(1),
(2), (4) Date: Aug. 19, 2008

(87) PCT Pub. No.: WO2006/123985
PCT Pub. Date: Nov. 23, 2006

(65) Prior Publication Data
US 2009/0105877 A1    Apr. 23, 2009

(30) Foreign Application Priority Data
May 20, 2005    (SE) ........................................ 0501130

(51) Int. Cl.
*H02P 3/26* (2006.01)
*B25J 19/00* (2006.01)
*H02P 3/14* (2006.01)

(52) U.S. Cl.
CPC ............... *H02P 3/14* (2013.01); *B25J 19/0004* (2013.01)
USPC ................. 700/256; 318/53; 318/57; 318/63; 318/376; 318/568.2; 700/250

(58) Field of Classification Search
CPC ............... H02P 3/14; H02P 3/16; H02P 3/18; H02P 3/26; B25J 19/0004
USPC ..................... 318/87, 53, 57, 63, 376, 568.11, 318/568.12, 568.17, 568.18, 568.2, 568.22, 318/568.24, 743, 759; 700/245, 246, 250, 700/254, 256
See application file for complete search history.

(56) References Cited

U.S. PATENT DOCUMENTS 4,460,834 A * 7/1984 Gottfried .......................... 307/64
4,520,300 A * 5/1985 Fradella .......................... 318/603

(Continued)

OTHER PUBLICATIONS

L.E. Davis Jr. et al., "Microprocessor Control of DC Motor Drives", Industry Applications Society Annual Meeting, 1992, Conference Record of Jan. 1992 IEEE, pp. 1782-1786, vol. 2.

*Primary Examiner* — Stephen Holwerda
(74) *Attorney, Agent, or Firm* — Harness, Dickey & Pierce, P.L.C.

(57) ABSTRACT

An embodiment of the present invention discloses an apparatus for recyclable absorption of electric retardation energy from a multiple axis industrial robotics system, including a robot control unit and at least one drive unit, which generates the electrical retardation energy at retardation. By an apparatus according to the present invention, the electric retardation energy, which occurs when a drive unit is retarded and is transferred into generator mode, may be recycled by the brake unit of the apparatus, which accelerates a mechanical device connected to the brake unit. The electric retardation energy is thus transferred into kinetic energy that may be stored in mechanical devices. An embodiment of the present invention also refers to a corresponding method for recyclable absorption of electric retardation energy from a multiple axis industrial robotics system.

16 Claims, 3 Drawing Sheets

(56) References Cited

U.S. PATENT DOCUMENTS

| | | | |
|---|---|---|---|
| 4,602,195 A * | 7/1986 | Eberle et al. | 318/568.11 |
| 5,155,423 A * | 10/1992 | Karlen et al. | 318/568.11 |
| 5,691,588 A * | 11/1997 | Lutz et al. | 310/92 |
| 5,784,238 A * | 7/1998 | Nering et al. | 361/65 |
| 5,936,375 A * | 8/1999 | Enoki | 318/727 |
| 6,166,504 A | 12/2000 | Iida et al. | |
| 6,293,846 B1 * | 9/2001 | Oguri | 451/6 |
| 6,815,915 B2 | 11/2004 | Hellstroem | |
| 2004/0033761 A1 * | 2/2004 | Ono et al. | 451/8 |
| 2004/0227479 A1 | 11/2004 | Youm | |
| 2005/0173198 A1 * | 8/2005 | Takehara et al. | 187/277 |
| 2006/0190136 A1 * | 8/2006 | Boyer | 700/245 |

* cited by examiner

CONVENTIONAL ART

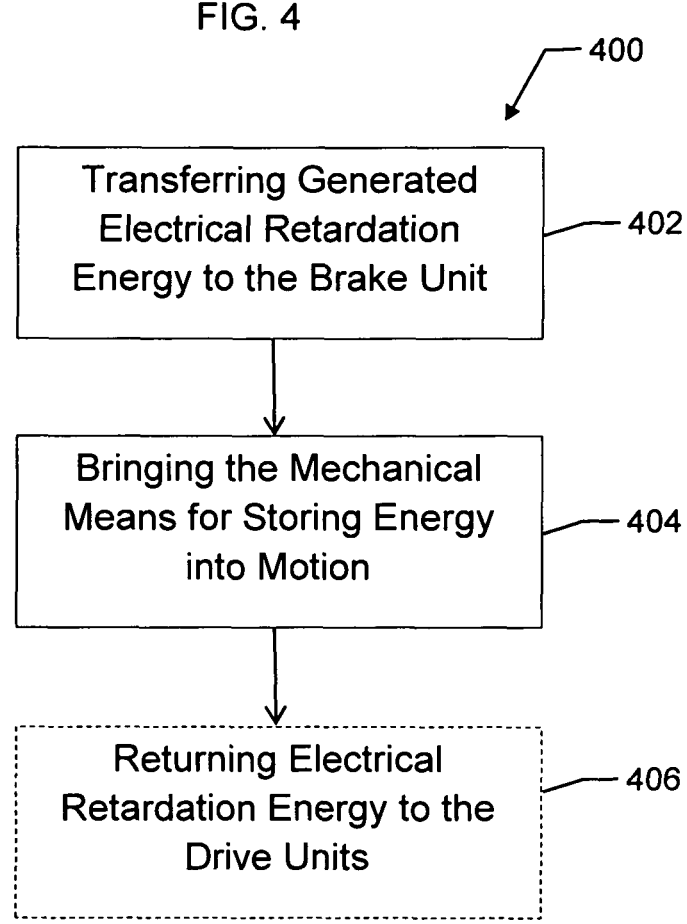

METHOD AND APPARATUS FOR RECYCLABLE ABSORPTION OF ELECTRIC RETARDATION ENERGY FROM AN INDUSTRIAL ROBOTICS SYSTEM

FIELD OF THE INVENTION

The invention refers to an apparatus for recyclable absorption of electric retardation energy from a multiple axis industrial robotics system. The invention also refers to a corresponding method for recyclable absorption of electric retardation energy from a multiple axis industrial robotics system.

BACKGROUND OF THE INVENTION

Automatization of tasks within industry has led to industry robots being used to a larger extent. Cost savings and work environment improvements are two of the main reasons for this development.

An industrial robotics system consists of a number of stiff arms being connected to each other and together forming a turnable chain. These arms are movable or turnable in relation to each other. Movement or turning of the arms is controlled by drive units.

The drive units are in traditional industrial robotics systems alternating voltage motors which are controlled by motor control units which are commonly fed with direct current over a DC intermediate link, and which converts the direct voltage to a pulse width modulated alternating voltage which is used to control the speed of the drive units.

When a robot arm is retarded the function of the drive unit transforms to act as a generator, so called generatoric operation, which causes a voltage increase in the DC intermediate link and thereby electric surplus energy. In order to secure that this voltage does not exceed a predetermined threshold, in the traditional industrial robotics system a so called "electric motor brake" is arranged, which in the traditional case comprises a resistor control unit that connects a brake resistor (together called a "brakechopper"), whereby the electric surplus energy is transformed into heat. In a certain type of traditional industrial robotics systems, the total surplus effect when the drive units of the industrial robotics system are being retarded may for a short while measure 50 kW.

US 2004/0227479 A1 describes a system in which a brake resistor has been connected in between one of the conductors in the DC intermediate link and a resistor control unit, which is connected to the second conductor in the DC intermediate link. A control module detects if the voltage level in the DC intermediate link exceeds a predetermined level and if electric surplus energy exists in the system. In the case where the voltage level exceed the predetermined level, the resistor control unit is re-connected so that both of the conductors in the DC intermediate link are short-circuited over the brake resistor, whereby the surplus energy transforms into heat energy. A problem with this system is that a heat increase around the industrial robotics system results in a life time reduction of drive units and control units. Furthermore, the energy loss that occurs when the brake resistor is connected is very costly.

U.S. Pat. No. 6,815,915 describes a device which is intended to partly solve the problems mentioned above by using a capacitor battery as a brake unit and energy buffer. However, this type of device is most suitable for smaller systems such as for example yarn feeders for textile machines, since large capacitor batteries are very expensive.

SUMMARY OF THE INVENTION

The object of the present invention is to provide an apparatus and a corresponding method solving some of the above mentioned problems.

These and other objects are fulfilled with an apparatus and a method according to the claims 1 and 9. Preferred embodiments are provided in the dependent claims.

A first aspect of the invention refers to an apparatus for recyclable absorption of electric retardation energy from a multiple axis industrial robotics system including a robot control unit and at least one drive unit which at retardation generates said retardation energy, which apparatus comprises the drive unit electrically connected to a brake unit which is arranged to bring a mechanical means in motion, whereby the apparatus recyclably absorbs said electric retardation energy.

A drive unit is here defined as a unit which when in operation consumes electric energy and then acts as a motor, and which at retardation transfers into generatoric operation and then acts as a generator. The same applies to the definition of a brake unit. Furthermore, here "mechanical means" denotes a means with a certain mass-moment of inertia such as a flywheel, an outer rotor motor or any other type of means which shows similar mechanical features. An outer rotor motor is thus constructed that the stator has its windings at the innermost, while the rotor with its magnets lies as a casing outside the stator. This makes the diameter of the stator and thus the mass-moment of inertia large. This construction provides a short thick motor and there is thus no need for an extra flywheel.

Through an apparatus according to the present invention the electric retardation energy, that occurs when a drive unit is retarded and transfers into generatoric operation, is used to accelerate the brake unit of the apparatus and the to the brake unit connected mechanical means. The electric retardation energy is thus transferred into kinetic energy which may be stored in the mechanical means and possibly be recycled. A further advantage with the present invention is that the heat increase that occurs from a traditional type of apparatus largely fails to occur, which results in extended life endurance of drive units and control units, which have been arranged in connection to an apparatus according to the present invention.

According to a preferred embodiment, the apparatus is arranged so that the retardation energy stored in the apparatus is transferred back to the industrial robotics system when accelerating at least one drive unit. This means that the industrial robotics system can obtain at least a part of the recycled electric energy that has been stored by the apparatus when retarding at least one of the drive units of the industrial robotics system, with that helping to accelerate at least one of the drive units of the industrial robotics system if that is needed. This has the advantage that the energy consumption peaks, that are created when at least one of the drive units of the industrial robotics system are started, can be limited. It is contemplated by the skilled man that the brake effect in operation must be in a so called standby position which means that the brake unit keeps a certain lowest number of revolutions in order to be able to receive the energy that is created when at least one of the drive units of the industrial robotics system is retarded. It is perceived that this lowest number of revolutions bears a relation to, for example, how much energy the apparatus is expected to receive and store.

The apparatus should be so arranged as to be able to receive an electrical effect above 1 kW, more preferably above 5 kW and most preferably above 15 kW, and able to store energy above 1 kJ, more preferably above 2 kJ and most preferably above 8 kJ. The skilled man contemplates that there is a relation between the construction of the apparatus, the size of it and how much energy that can be stored and received, and that the apparatus can be constructed so that it is suitable for industrial robotics systems in which the need for energy storage and energy reception is both greater and lesser than the above mentioned intervals.

According to an especially preferred embodiment, said robot control unit is so arranged that it monitors the kinetic status of the industrial robotics system. Monitoring of the industrial robotics system can advantageously be arranged in a number of ways, for example by that the robot control unit measures fluctuations in the currents and/or voltages of the DC intermediate link and adjusts the number of revolutions of the brake unit accordingly. This means that if an increasing voltage and/or a decreasing current is detected, the number of revolutions of the brake unit is decreased. According to second example, a number of accelerometers can be arranged on the industrial robotics system. These accelerometers communicates the measured acceleration/retardation to the robot control unit, whereby the robot control unit can calculate the kinetic status of the industrial robotics system and in the same way as above change the number of revolutions of the brake unit. In a third example, the number of revolutions of the industrial robotics system may be sampled, whereby the robot control unit can estimate the kinetic status of the industrial robotics system and change the number of revolutions of the brake unit. By continuously knowing the kinetic status of the industrial robotics system and how much energy that is stored in the apparatus, a size optimisation of the apparatus may be made, which brings economic advantages when constructing and dimensioning the apparatus.

According to an especially preferred embodiment, the apparatus is arranged to act as spare power for the robot control unit of the industrial robotics system. If an interruption of the power supply occurs, a number of the parameters of the industrial robot must be saved/stored so that the system will not have to be recalibrated when the power returns. In a traditional system a UPS ("uninterruptible power supply") or any other type of interruption free power supply of battery-type is used. An advantage with the apparatus according to the present invention is thus that the energy stored in the apparatus can be used as spare power in the same way as a battery/UPS is used in the traditional system.

A second aspect of the invention refers to an industrial robotics system comprising a robot control unit, at least one drive unit and an apparatus according to what is described above. The apparatus may advantageously be constructed together with an industrial robotics system and thereby create a complete unit.

In a similar way, a third aspect of the invention refers to an energy supply system comprising a transformer unit, a direct voltage switching unit and an apparatus according to what is described above, whereby the apparatus is constructed together with the power supply system and thereby creating a complete unit.

A fourth aspect of the invention refers to a method for recyclable absorption of electric retardation energy from a multiple axis industrial robotics system, using an apparatus comprising a brake unit which is arranged to bring a mechanical means in motion, including the steps to, at retardation, transfer the by the drive unit generated electric retardation energy to said brake unit, and bring said mechanical means in motion, whereby the apparatus recyclably absorbs said electric retardation energy. As described above in relation to the first aspect of the present invention this method offers the possibility to return, to the drive units of the industrial robotics system, the energy that is created when at least one of the drive units of the industrial robot is retarded. In the same way the heat increase that traditionally occurs at said retardation is lowered.

BRIEF DESCRIPTION OF THE DRAWINGS

The invention will be described in more detail in the following with reference to the appended schematic drawings which for exemplifying reasons show a currently preferred embodiment of the invention.

FIG. 4 shows a process flow diagram of a method according to an example embodiment.

DESCRIPTION OF PREFERRED EMBODIMENTS

Figure 1:
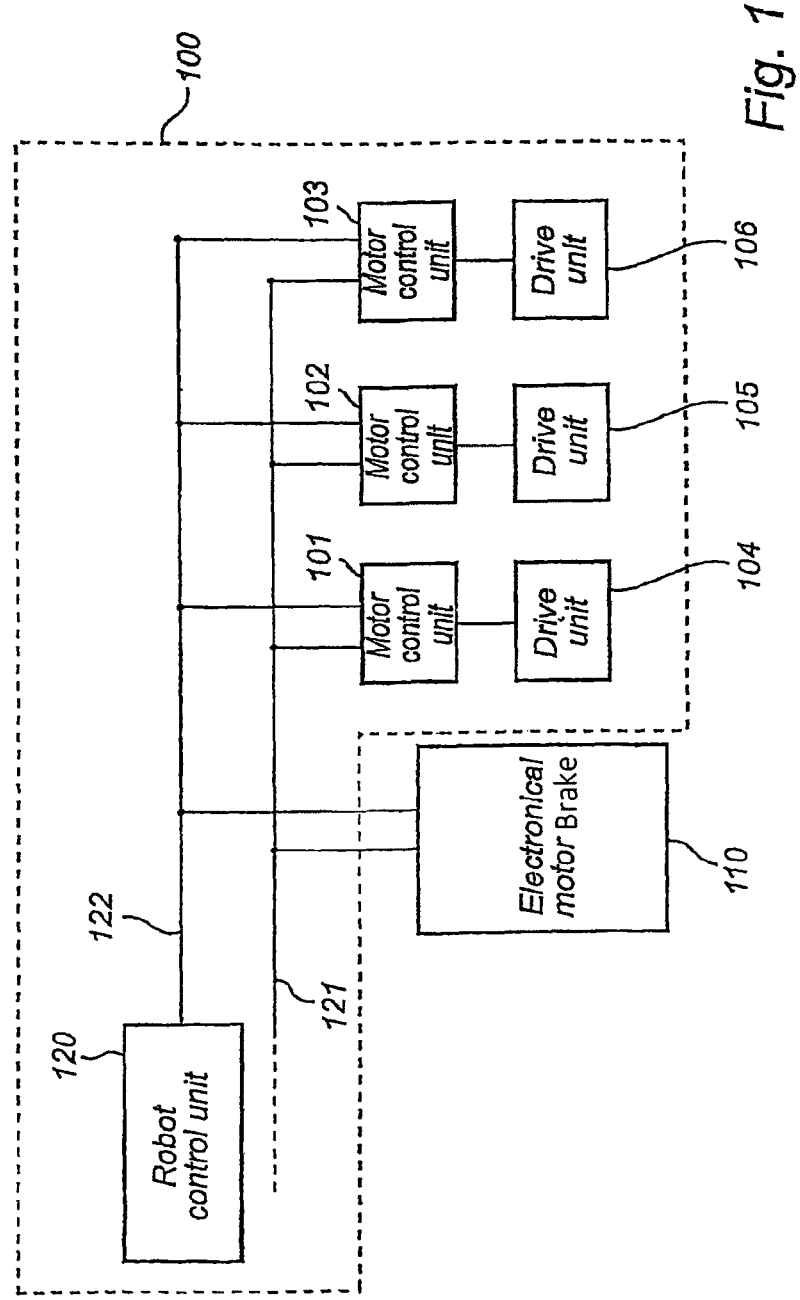
FIG. 1 shows a simplified block diagram of a traditional industrial robotics system.

FIG. 1 shows a simplified block diagram of a traditional industrial robotics system 100 comprising a number of motor control units 101-103, and to each of the motor control units 101-103 associated drive units 104-106. FIG. 1 further shows an apparatus for recyclable absorption of retardation energy, a so called "electric motor brake" 110, and a robot control unit 120. As can be seen, the motor control units 101-103 and the electric motor brake 110 with an electric conductor through the so called DC intermediate link 121, which is used for power supply to the industrial robotics system. The power supply is provided by a transformer and a rectifying device (not shown). The motor control units 101-103 transforms the direct voltage to a pulse width modulated alternating voltage which is used to control the speed of the drive units 104-106. The motor control units 101-103, the electric motor brake 110 and the robot control unit 120 communicates with an electric conductor or with a non-contact transfer over the signal bus 122.

The electric energy which is returned to the DC intermediate link 121 via the motor control units 101-103 at generatoric operation of the drive units 104-106 (retardation), causes the electric surplus energy in the DC intermediate link 121 (increase of voltage), whereby the robot control unit 120, which functions as a monitoring- and control unit, activates the electric motor brake 110 which handles the generated electric surplus energy.

Figure 2:
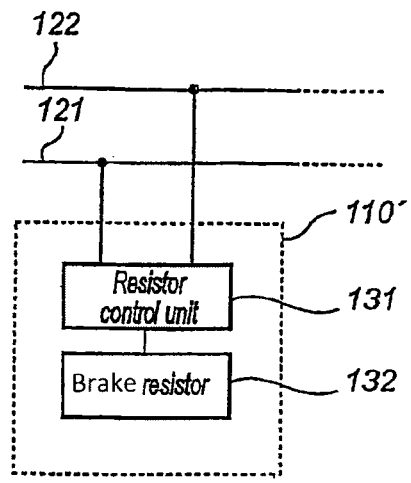
FIG. 2 shows a block diagram of a traditional apparatus for absorbing retardation energy.

In a traditional industrial robotics system the electric motor brake 110 consists of a so called "brakechopper" 110', which is shown by a block diagram in FIG. 2. Brakechopper 110' comprises a resistor control unit 131 and a brake resistor 132, which are connected to each other by an electric conductor. The functionality is (such that the brakechopper 110' is activated, such as is described above, in order to secure that the voltage of the DC intermediate link 121 does not exceed a certain threshold, whereby the surplus energy further is transformed into heat in the brake resistor 132. In certain cases is also mounted a fan in order to transfer away the generated heat (not shown).

Figure 3:
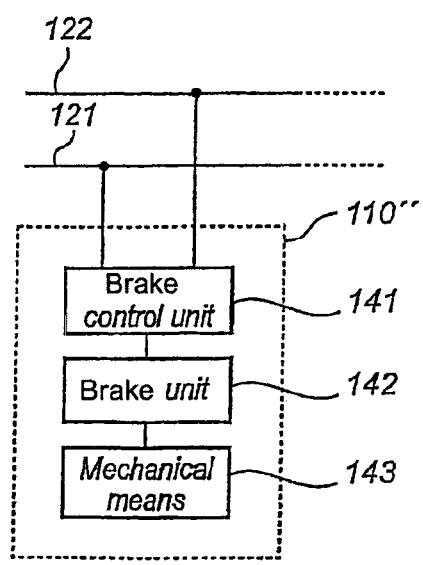
FIG. 3 shows a block diagram of an apparatus according to the present invention for recyclable absorption of electric retardation energy.

In another industrial robotics system the electric motor brake 110 comprises an apparatus 110" according to the present invention, as is shown with a block diagram in FIG. 3.

The apparatus 110" here comprises a brake control unit 141, a brake unit 142 and a mechanical means 143, such as for example a flywheel. The brake control unit 141 and the brake unit 142 is connected to each other by an electric conductor, while the mechanical means 143 is mechanically attached and, further, mounted on the brake unit. As is described above, the brake unit 142 and the mechanical means 143 may for example instead comprise of a complete unit such as a so called outer rotor motor.

When any of the drive units 104-106 is retarded and transforms into generatoric operation the voltage in the DC intermediate link 121 is increased. The robot control unit 120 detects this and signals to the brake control unit 141 which allows more current to the brake unit 142 which thereby is accelerated, whereby the mechanical means 143 is also accelerated. The electric retardation energy is thus transformed into kinetic energy which is stored in the mechanical means 143. When any of the drive units 104-106 shall be accelerated the robot control unit 120 signals this, over the signal bus 122, to the brake control unit 141 which lets the brake unit 142 transfers into generatoric operation whereby a voltage increase occurs on the DC intermediate link 121, which is used by the accelerating drive unit 104-106. The surplus energy that was created at the retardation of one of the drive units 104-106 has thereby been recycled and is used at a succeeding acceleration of any one of the drive units 104-106.

FIG. 4 shows a method 400 for recyclable absorption of electric retardation energy from a multiple axis industrial robotics system, using an apparatus including a brake unit arranged to bring a mechanical means for storing energy into motion. The method 400 may include transferring, via a drive unit, generated electric retardation energy to the brake unit at retardation 402. The method 400 may include bringing the mechanical means for storing energy into motion 404. The method 400 may include returning stored electrical retardation energy to the drive units 406.

Finally, it should be added that the invention in no way is limited to the described embodiments. For example, the apparatus may be arranged as a unit separate from the industrial robotics system, but it can also be arranged as an integrated unit together with the industrial robotics system. In a similar manner, the apparatus may be arranged together with an energy supply system, which except for the apparatus comprises a transformer unit and a direct voltage switching unit. The apparatus may also be mounted in parallel to a traditional electric motor brake and one may in this way dimension and construct a complete apparatus which is arranged such that it by the help from the brake unit and the mechanical means takes care of the normal operation, while the traditional electric motor brake can be used at extreme voltage increases in the DC intermediate link, such as at a emergency deceleration of the industrial robotics system. In the same way, the skilled man recognises that the apparatus according to the present invention further may comprise for example a gear box construction giving enhanced construction possibilities.

The invention claimed is:

1. A multiple axis industrial robotics system comprising:
   a DC link;
   a plurality of motor control units connected to the DC link, and configured to transform direct voltage into alternating voltage;
   a plurality of motors configured to operate based on said alternating voltage, wherein said motors, at retardation, generate electric retardation energy which is returned to the DC link in the form of a voltage increase on said DC link;
   a robot control unit configured to control said motors; and
   an energy storage apparatus including,
     one of said motor control units,
     a brake unit in the form of one of said motors connected to said one of said motor control units, and
     a mechanical element mechanically connected to said brake unit, said mechanical element having a mass-moment of inertia,
   wherein said robot control unit is configured to detect said voltage increase and, in response to said voltage increase, accelerate said brake unit to accelerate said mechanical element, such that said electric retardation energy is stored as kinetic energy in said mechanical element.

2. The system according to claim 1, wherein the robot control unit is configured to monitor a kinetic status of the industrial robotics system.

3. The system according to claim 1, wherein the energy storage apparatus is arranged to act as spare power for the robot control unit.

4. The system according to claim 1, wherein the energy storage apparatus is configured to store energy exceeding 1 kJ.

5. The system according to claim 1, wherein the energy storage apparatus is configured to receive an electrical effect exceeding 1 kW.

6. The system according to claim 1, further comprising:
   a transformer unit; and
   a direct voltage switching unit connected to said DC link.

7. A method for recyclable absorption of electric retardation energy from a multiple axis industrial robotics system, comprising the steps of:
   providing a DC link;
   connecting a plurality of motor control units to the DC link, said motor control units configured to transform direct voltage into alternating voltage;
   connecting a plurality of motors to be controlled by said alternating voltage, wherein said motors, at retardation, generate electric retardation energy which is returned to the DC link in the form of a voltage increase on said DC link;
   providing an energy storage apparatus including one of said motor control units, a brake unit in the form of one of said motors connected to said one of said motor control units, and a mechanical element mechanically connected to said brake unit, said mechanical element having a mass-moment of inertia;
   detecting said voltage increase; and
   accelerating, in response to said voltage increase, said brake unit to accelerate said mechanical element, such that said electrical retardation energy is stored as kinetic energy in said mechanical element.

8. The method according to claim 7, further comprising: transferring, during the accelerating, electrical energy from the apparatus back to a drive unit.

9. The method according to claim 7, further comprising: monitoring a kinetic status of the industrial robotics system.

10. The method according to claim 7, further comprising: detecting a change of a power supply to the industrial robotics system; and
    transferring back spare power from the energy storage apparatus to a robot control unit based on the detected change.

11. The system according to claim 4, wherein the energy storage apparatus is configured to store energy exceeding 2 kJ.

12. The system according to claim 11, wherein the energy storage apparatus is configured to store energy exceeding 8 kJ.

13. The system according to claim 5, wherein the energy storage apparatus is configured to receive an electrical effect exceeding 5 kW.

14. The system according to claim 5, wherein the energy storage apparatus is configured to receive an electrical effect exceeding 15 kW.

15. The system according to claim 1, wherein the mechanical element is a flywheel connected to said brake unit.

16. The system according to claim 1, wherein said brake unit is an outer rotor motor, having an outer rotor surrounding a central stator, wherein said mechanical element is formed by said rotor.

* * * * *